Oct. 30, 1951 — J. H. MURPHY — 2,573,215
FISHING LURE
Filed June 7, 1948 — 2 SHEETS—SHEET 1
FIG. 1.
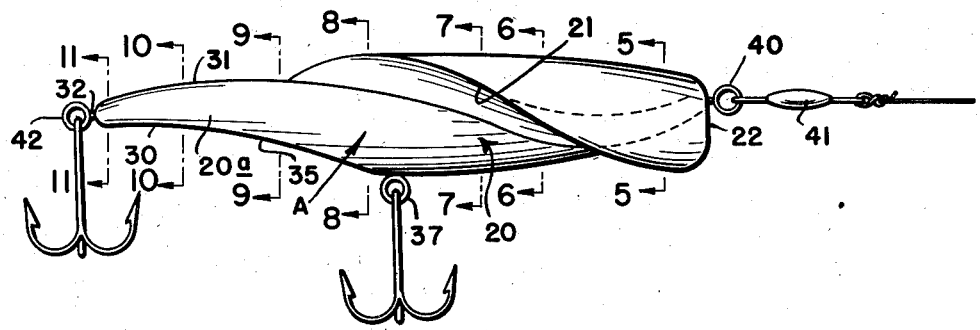
FIG. 2.
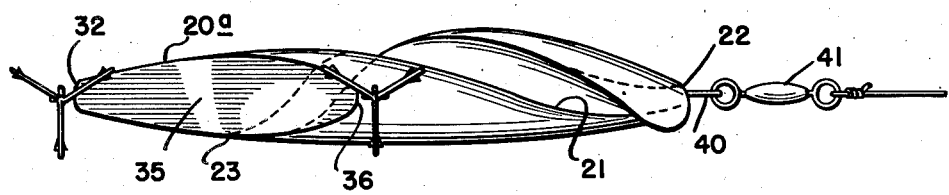
FIG. 3.
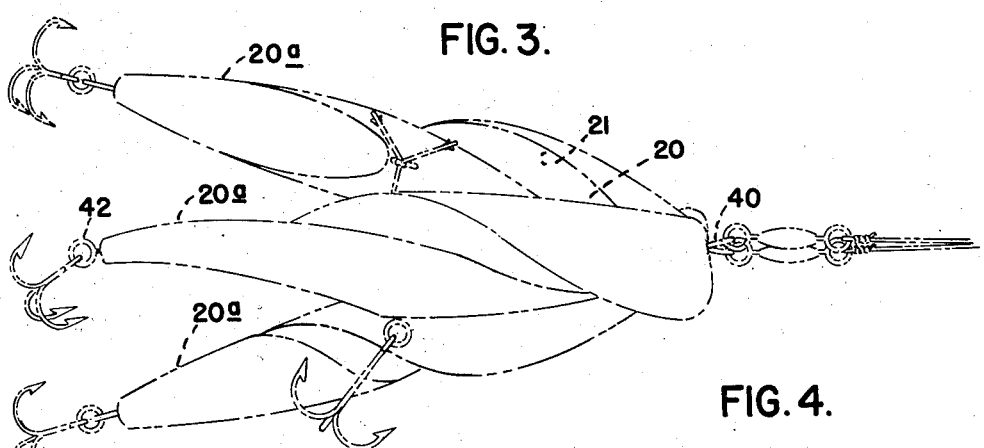
FIG. 7. FIG. 6. FIG. 5.
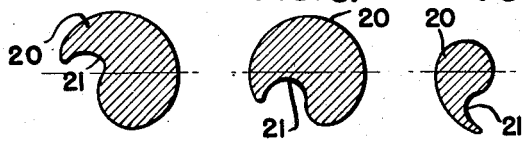
FIG. 4.
FIG. 11. FIG. 10. FIG. 9. FIG. 8.
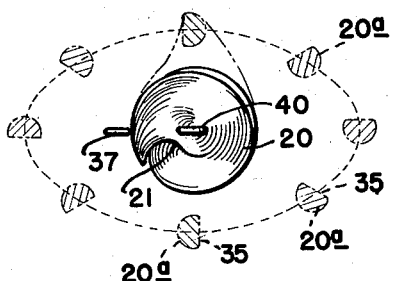
INVENTOR.
John H. Murphy
BY *Lancaster, Allwein & Rommel*
ATTORNEYS.

Oct. 30, 1951  J. H. MURPHY  2,573,215
FISHING LURE
Filed June 7, 1948  2 SHEETS—SHEET 2

INVENTOR.
John H. Murphy
BY
ATTORNEYS.

Patented Oct. 30, 1951

2,573,215

UNITED STATES PATENT OFFICE 2,573,215

FISHING LURE

John Harry Murphy, Detroit, Mich.

Application June 7, 1948, Serial No. 31,565

7 Claims. (Cl. 43—42.46)

This invention relates to improvements in fishing lures.

The primary object of this invention is the provision of an improved fishing lure having a spinning as well as a lateral movement.

A further object of this invention is the provision of an improved fishing lure having improved means to provide a lateral whipping movement thereof.

A further object of this invention is the provision of improved action for a fishing lure.

Other objects and advantages of the invention will be apparent from the following detailed description taken in connection with the accompanying drawings forming a part of this specification and in which drawings—

Figure 1 is a side elevation of one embodiment of the improved fishing lure.

Figure 2 is a bottom view of the fishing lure.

Figure 3 shows wholly in dot and dash lines the action of the fishing lure.

Figure 4 is a front elevation of the fishing lure showing in dotted lines the lateral action of the fishing lure.

Figure 12:
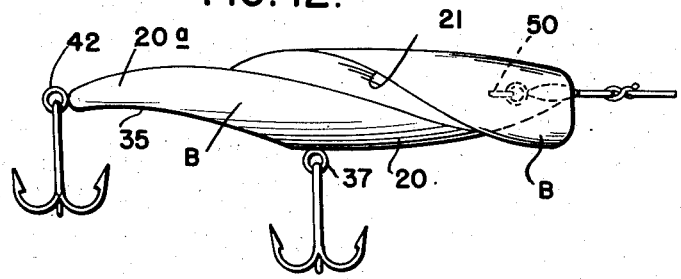

Figures 5 to 11 inclusive are cross sectional views taken substantially on the respective lines shown in Figure 1 of the drawing.

Figure 12 is a side elevation of another embodiment of the fishing lure.

Figure 13:
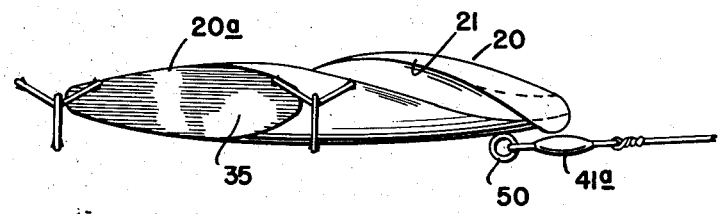

Figure 13 is a bottom elevation of the form of fishing lure shown in Figure 12.

Figure 14:
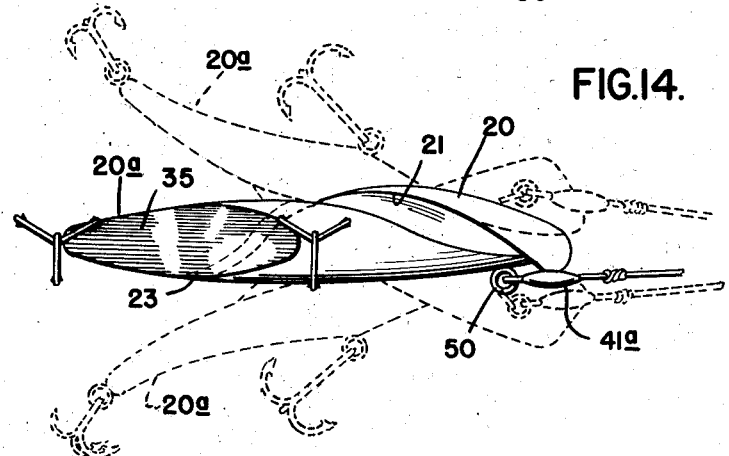

Figure 14 is a bottom view of the fishing lure showing in dotted lines the whipping action of the fishing lure shown in Figure 12.

Figure 15:
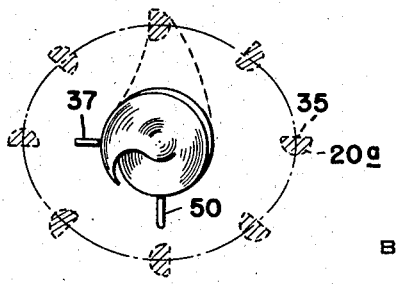

Figure 15 is a front elevation of the fishing lure of Figure 12 showing the lateral action thereof in dotted lines.

In the drawings, wherein for the purpose of illustration are shown preferred and modified forms of the invention, the letters A and B may generally designate the two forms of invention shown in Figures 1 and 12 respectively.

Insofar as applicable, similar reference characters are applied to both forms of the invention. Each form includes an elongated body 20 formed of wood, plastic or metal or any other approved material. The plug body is tapered from a location intermediate its ends in both directions, the rear end having the greater taper. The point of greatest cross section is approximately section line 7—7 which is closer to the front end than the rear end.

The body portion 20 is provided with a spiral groove 21 extending from the extreme nose tip 22 to a point designated at 23 (Figures 2 and 14). This groove is spiraled and makes one complete convolution of approximately 360°. The groove 21 in cross section is concaved. As shown in Figure 5, the groove 21 is of approximately the depth shown. From the location of this sectional view the depth of the groove gradually increases to approximately the depth shown in Figure 7, which is substantially the widest part of the plug body 20. Therefrom the groove 21, as shown in Figures 8 and 9, gradually decreases in depth and the groove ends at the location 23.

The tail portion 20a of the body 20 curves or is arched slightly in a downward direction, the concave side 30 facing downwardly and the convex side 31 facing upwardly, as shown in Figures 1 and 12. This curvature starts slightly forwardly of the spiral groove end 23 and extends to the extreme tail end 32 which is convexed.

In addition to its slight curvature, the tail portion 20a is also provided on its under side with a transversely flattened surface 35 which is slightly concaved longitudinally of the body. This extends from the extreme tail end 32 to a point 36 just short of the midway point of the body 20, where the hook supporting eye 37 is located.

The front 22 is provided with an eye 40, Figures 1 to 11, for connection of a swivel 41 of any approved type. At the rear end 32 a hook supporting eye 42 may be located.

Concerning the action of the lure A, as it is drawn or trolled thru the water, the spiral groove will impart a spinning or rotary motion to the lure centered along the longitudinal axis of the lure. The shape of the groove and the fact that a single convolution is provided insures that the spinning action will not be too fast. The slightly curved tail 20a imparts a lateral whipping motion as does also the flattened or convexed-flat surfacing 35. The latter imparts a greater lateral whipping motion to the lure body, as represented by the widest spaced dotted line position shown in Figure 4, which extends for approximately 15° to each side of the longitudinal axis or center position of the lure body. The curved tail as shown in Figure 1 limits the degree of whipping action, as shown in the dotted positions of Figure 4.

Referring to the form of invention, Figs. 12 to 15, inclusive, the only distinguishing characteristic in this form is the fact that the swivel connecting eye 50 is provided upon a side of the lure, say the left side, as shown in Figure 12. The swivel 41a is connected thereto. The swivel connecting eye 50 is located approximately ½" more or less from the front tip of the lure altho the distance may vary.

It can readily be seen from Figure 14 that the side location of the swivel connecting eye also imparts a lateral whipping motion to the front end of the lure. The whipping motion is more uniform in form A than form B, as shown by the dotted lines in Figure 15.

Various changes in the shape, size and arrangement of parts may be made to the forms of invention herein shown and described without departing from the spirit of the invention or the scope of the following claims.

I claim:

1. As an article of manufacture a fishing lure comprising an elongated body having an exposed single spiral groove of substantially 360° therealong terminating appreciably short of the rear end thereof, said body at the rear end only being appreciably more flattened at one side than the other.

2. As an article of manufacture a fishing lure comprising an elongated body having an exposed single spiral groove of substantially 360° therealong terminating appreciably short of the rear end thereof, said body at the rear end only being appreciably more flattened at one side than the other and also slightly laterally curved.

3. As an article of manufacture a fishing lure comprising an elongated body having means thereon for supporting hooks, means for connecting a line thereto, and a spiral groove along the body from the nose end thereof, said groove increasing gradually in depth from the nose end to a point intermediate the ends of the body and therefrom tapering in a decreasing depth towards the tail end of the body.

4. As an article of manufacture a fishing lure comprising an elongated body having means thereon for supporting hooks, means for connecting a line thereto, and a spiral groove along the body from the nose end thereof, said groove increasing gradually in depth from the nose end to a point intermediate the ends of the body and therefrom tapering in a decreasing depth towards the tail end of the body, said groove terminating short of the tail end of the body.

5. As an article of manufacture a fishing lure comprising an elongated body having means thereon for supporting hooks, means for connecting a line thereto, and a spiral groove along the body from the nose end thereof, said groove increasing gradually in depth from the nose end to a point intermediate the ends of the body and therefrom tapering in a decreasing depth towards the tail end of the body, said groove terminating short of the tail end of the body and the tail end of the body being arched to provide a whipping motion to the body as the lure is drawn through the water.

6. As an article of manufacture a lure comprising an elongated body having a spiral groove opening at the front thereof and extending longitudinally thereof for its major length, said body rearwardly of the midway point thereof having a laterally curved tail one side of which is concavely flattened and the directly opposed side of which is convex both longitudinally and transversely, said spiral groove extending partially into the length of said tail.

7. As an article of manufacture a fishing lure comprising an elongated body provided with a spiral groove extending thereabout longitudinally thereof opening at the front end thereof and terminating short of the extreme rear end thereof and extending for substantially 360° around the body thruout its length, said groove being of shallowest depth at the extreme ends thereof and gradually increasing in depth therefrom towards the midway point of said body, said body rearwardly of the midway point thereof having a laterally curved tail portion one side of which is concavely flattened and the directly opposed side of which is convexly shaped both transversely and longitudinally, and means associated with the body for attaching a line and hooks thereto.

JOHN HARRY MURPHY.

REFERENCES CITED

The following references are of record in the file of this patent:

UNITED STATES PATENTS

| Number | Name | Date |
|---|---|---|
| 644,911 | Hedgeland | Mar. 6, 1900 |
| 1,256,155 | O'Brien | Feb. 12, 1918 |
| 1,418,326 | Pflueger et al. | June 6, 1922 |
| 1,725,636 | Heaslip | Aug. 20, 1929 |
| 1,739,258 | Quin | Dec. 10, 1929 |

FOREIGN PATENTS

| Number | Country | Date |
|---|---|---|
| 2,102 | Great Britain | 1890 |
| 19,111 | Great Britain | 1901 |